(12) United States Patent
Eisenhardt

(10) Patent No.: US 7,679,305 B2
(45) Date of Patent: Mar. 16, 2010

(54) METHOD AND DEVICE FOR TEMPERATURE LIMITATION ACCORDING TO CURRENT AND/OR VOLTAGE

(75) Inventor: Harald Eisenhardt, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 11/719,627

(22) PCT Filed: Feb. 20, 2006

(86) PCT No.: PCT/EP2006/060090

§ 371 (c)(1),
(2), (4) Date: May 17, 2007

(87) PCT Pub. No.: WO2006/111430

PCT Pub. Date: Oct. 26, 2006

(65) Prior Publication Data

US 2009/0153088 A1    Jun. 18, 2009

(30) Foreign Application Priority Data

Apr. 18, 2005    (DE) .................... 10 2005 017 801

(51) Int. Cl.
*G05D 23/00*    (2006.01)

(52) U.S. Cl. .................. 318/471; 361/25; 323/369; 322/33; 322/34

(58) Field of Classification Search .......... 361/25; 318/471; 323/369; 322/33, 34
See application file for complete search history.

(56) References Cited

U.S. PATENT DOCUMENTS

| 4,035,692 | A | * | 7/1977 | Luy et al. .................. 361/103 |
| 5,548,202 | A | * | 8/1996 | Schramm et al. ............. 322/33 |
| 5,718,373 | A | * | 2/1998 | Kim et al. .................... 236/35 |
| 5,981,918 | A |   | 11/1999 | Topp et al. |
| 6,078,511 | A |   | 6/2000 | Fasullo et al. |
| 6,148,627 | A | * | 11/2000 | Reason et al. ................. 62/217 |
| 7,035,064 | B2 | * | 4/2006 | Schimanek et al. .......... 361/23 |
| 2003/0214770 | A1 |   | 11/2003 | Schimanek et al. |
| 2005/0039716 | A1 | * | 2/2005 | Young et al. .......... 123/142.5 R |
| 2005/0088137 | A1 | * | 4/2005 | Cohen et al. ................ 318/806 |

* cited by examiner

*Primary Examiner*—Rita Leykin
(74) *Attorney, Agent, or Firm*—Michael J. Striker

(57) ABSTRACT

The invention relates to a method for temperature limitation according to the current and/or voltage, for an actuating device (10) associated with an electric motor (M), especially a fan regulator (12) of a motor vehicle, the temperature limitation being carried out according to at least one operating parameter of the motor (M). The invention also relates to a corresponding device (1) and a fan regulator (12).

10 Claims, 1 Drawing Sheet

METHOD AND DEVICE FOR TEMPERATURE LIMITATION ACCORDING TO CURRENT AND/OR VOLTAGE

CROSS-REFERENCE TO A RELATED APPLICATION

Figure 1A:
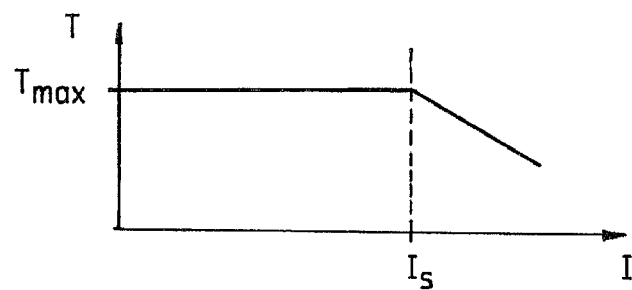

The invention described and claimed hereinbelow is also described in German Patent Application DE 102005017801.4, filed on Apr. 18, 2005. This German Patent Application provides the basis for a claim of priority of invention under 35 U.S.C. 119(a)-(d).

The present invention relates to a method for temperature limitation according to current and/or voltage for an actuating device assigned to an electric motor, according to the preamble of claim 1, a related device according to the preamble of claim 7, and a fan regulator according to claim 10.

RELATED ART

Methods for limiting temperature that are used with an actuating device assigned to an electric motor are known. According to these methods, e.g., the temperature of the actuating device or the temperature of a housing in which the actuating device is located is measured, and the actuating device is switched off as soon as a maximum permissible temperature value is exceeded. Related devices are also known that include, e.g., special power semiconductors with thermal protection, depending on the design. Even though the methods and devices according to the related art have proven effective in various applications, they are too complex or expensive for use in low-cost and/or small electric motors. A low-cost solution is desired for use, in particular, with fan regulators in motor vehicles, which are used to regulate the speed of a climate-control fan motor. It is known in this case to use temperature limitation with a fixed, preset maximum temperature. To prevent this protective device from responding prematurely, the maximum temperature is typically set at a level such that the protective device is not yet actuated when the ambient temperature is high and current is at a maximum. In these operating states, the soldering points and current-carrying elements of the fan regulator are under extreme loads, which can destroy the soldering points. At a high operating voltage, or when fault condition exists, e.g., if the motor is jammed or is sluggish-running, the power loss in the power semiconductors of the fan regulator—particularly in the case of a linear fan regulator—can increase so rapidly that the power components of the fan regulator become damaged or at least slightly damaged, and the service life of the fan regulator is limited. A sluggish-running motor does not always represent a mechanical defect, however. For instance, the fan motor is already exposed to increased resistance and may even come to a standstill when the motor vehicle moves at a high rate of speed. Aerodynamic pressure forms in front of the fan motor, and a vacuum may form behind the fan motor, particularly when a sliding sunroof is opened slightly. Nor is elevated operating voltage necessarily a sign of a fault condition. Instead, in modern motor vehicle electrical systems, the alternator voltage of the generator varies with the temperature of the vehicle battery. At low outside temperatures, the charging voltage is typically increased, in order to permit increased electrical system output in these operating states for winter operation when numerous electrical devices are switched on. Conversely, the charging voltage is reduced when the outside temperature is high, since the service life of the vehicle battery is shortened when the charging voltage is too high.

ADVANTAGES OF THE INVENTION

With a method for temperature limitation according to current and/or voltage, for an actuating device assigned to an electric motor, particularly for a fan regulator of a motor vehicle, it is provided according to the present invention that the temperature limitation be carried out as a function of at least one operating parameter of the motor. This means the temperature limitation is harmonized with the operating behavior and the particular current operating state of the motor. With the related art, one had to accept the fact that the actuating device had to be designed larger in size to accommodate higher requirements, and the fact that the service life would be shortened by increasing the maximum value. With the present invention, however, the temperature limitation can be designed to be dynamic, using simple means. This results, in particular, in a cost-optimized design of the actuating device and the entire device, e.g., since the system need not be over-sized in design. A decisive finding was made, e.g., that it is necessary to take fault conditions into account and to respond to them, but that it is also necessary to take situations with unfavorable operating conditions (e.g., a sluggish-running motor at a high rate of speed or an elevated generator voltage when outside temperatures are low) into account, and to respond to them. The details of a procedure of this type will be described in greater detail using the exemplary embodiment.

The operating parameter is advantageously chosen from the group composed of operating current and supply voltage. Operating current is understood to mean the current that is conducted through the actuating device to the motor. The supply voltage is understood to mean the voltage that is present at the motor and/or the actuating device. It is possible to monitor either the operating current or the supply voltage, or both.

Preferably, the maximum permissible temperature of the actuating device is reduced when the operating current rises above a specified threshold, at the least. If a temperature controller is used, this means the temperature set by the temperature controller is reduced when the operating current rises (at least above a specified threshold value). The maximum value is preferably reduced in a linear manner, although it can basically have any other curve shape.

Advantageously, the maximum value of a permissible temperature of the actuating device is reduced when the supply voltage rises above a specified threshold, at the least. If a temperature controller is used, this means the temperature set by the temperature controller is reduced when the supply voltage rises (at least above a specified threshold value). The maximum value is preferably reduced in a linear manner, although it can basically have any other curve shape.

With a preferred embodiment, with which temperature limitation is carried out as a function of several operating parameters, the reductions of the maximum value of a permissible temperature assigned to each operating parameter are combined to obtain an overall reduction of the maximum value. This means a total value is determined based on the individual reductions of the maximum value assigned to the individual operating parameters, in order to reduce the maximum value of a permissible temperature of the actuating device. It is advantageous, in particular, to add a reduction based on the operating current and a reduction based on the supply voltage.

The temperature limitation is advantageously activated before the maximum value of a permissible temperature of the actuating device is reached. By regulating the temperature downward in advance, the increase in the power loss of the actuating device and the damage to power components that may result therefrom are prevented.

This can also prevent the operating current from rising, thereby preventing an impermissible temperature increase at the soldering points of the actuating device that are loaded with operating current.

The present invention also relates to a device for temperature limitation according to the current and/or voltage, for an actuating device assigned to an electric motor, particularly for a fan regulator of a motor vehicle, with an electrical switching device that carries out the temperature limitation as a function of at least one operating parameter of the motor.

The switching device preferably includes a temperature controller that is designed as an amplifier in particular, and to the output of which a power semiconductor element that influences the actuation of the motor is assigned. This results in a rapid and easily realized response to the operating state of the motor and, therefore, to the operating state of the actuating device.

It is advantageous when a component with a temperature-dependent property is assigned to the temperature controller, particularly a resistor with a negative temperature coefficient. Using the component, it is possible to measure temperature in a simple, economical manner.

Finally, the present invention also relates to a fan regulator with a device—described above—with one or more of the features described.

DRAWING

The present invention will now be explained in greater detail with reference to exemplary embodiments.

Figure 1B:
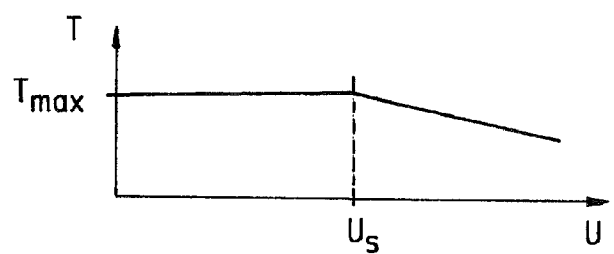
Figure 2:
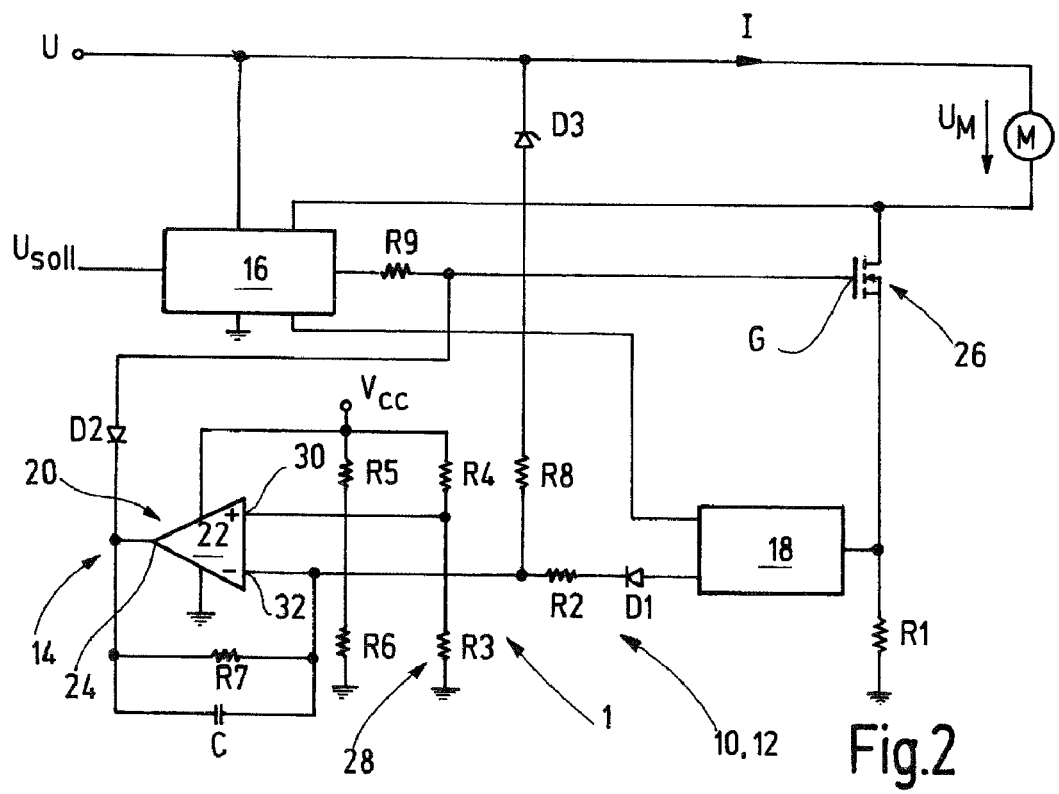

FIG. 1a is an illustration of temperature limitation used in a linear fan regulator, as a function of operating current, FIG. 1b is an illustration of temperature limitation as a function of supply voltage, and FIG. 2 is an illustration of a fan regulator with a device for temperature limitation according to current and/or voltage.

DESCRIPTION OF THE EXEMPLARY EMBODIMENTS

FIG. 1a is an illustration of temperature limitation used in a linear fan regulator, as a function of operating current. Operating current I is plotted on the x-axis, and the temperature T of an actuating device and/or a fan regulator is plotted on the y-axis. When the operating current is below a current threshold value $I_S$, a maximum value $T_{max}$ of a permissible temperature of the actuating device is permitted. This maximum value $T_{max}$ results regularly, depending on the design and/or construction. If operating current I exceeds current threshold value $I_S$ during operation, the maximum permissible temperature value is lowered. This reduction takes place in a linear manner, although the reduction can have any other curve shape.

A similar situation is shown in FIG. 1b. In this case, a supply voltage U is plotted on the x-axis, and a maximum permissible temperature T is plotted on the y-axis. If supply voltage U is below a supply voltage threshold value $U_S$, a maximum temperature $T_{max}$ is set. If supply voltage U exceeds supply voltage threshold value $U_S$, this maximum temperature value is reduced.

FIG. 2 shows a circuit diagram of a device 1 for temperature limitation according to the current and/or voltage, for an actuating device 10 assigned to an electric motor M, particularly for a fan regulator 12 of a motor vehicle, with an electrical switching device 14 that carries out the temperature limitation as a function of at least one operating parameter of motor M. Device 1 includes a motor voltage regulator 16, a motor current measuring device 18, and a temperature controller 20 that is designed as an amplifier 22 in this case. An output 24 of amplifier 22 is assigned to gate G of a power semiconductor element 26 that influences the actuation of motor M. Device 1 also includes resistors R1 through R9, diodes D1 through D3, and a capacitor C. Device 1 is supplied with supply voltage U and auxiliary voltage $V_{CC}$. An operating current I is established during operation. Resistor R1 should be noted here in particular; it is a component 28 with a temperature-dependent property, which is a negative temperature coefficient in this case.

The mode of operation is as follows: During normal operation, fan motor voltage $U_M$ is adjusted by motor voltage regulator 16 depending on a target value $U_{SOLL}$ that is assigned externally. Temperature controller 20 is not operating, and it outputs the maximum possible voltage value at its output 24. If the temperature of actuating device 10 now increases, the value of resistor R3 decreases. This causes the voltage at non-inverting input 30 to decrease and become less than the voltage at inverting input 32. Output 24 of temperature controller 20 is activated as a result. The control voltage present at gate G is reduced by coupling output 24 with gate G of power semiconductor component 26, which influences the actuation of motor M. This voltage reduction continues until the value of resistor R3 increases again as a result of the decrease in measured temperature. The voltage ratios at inverting input 32 and at non-inverting input 30 are reversed again, and normal operation is established once more.

In addition to this function, an increase in supply voltage U is also monitored. A zener diode D3 is provided for this function; it permits current to flow when supply voltage U increases. As a result, the voltage at inverting input 32 of temperature controller 20 increases. Since the voltage at inverting input 32 was increased, the downward temperature regulation described above now takes place at a lower temperature. The reason for this is that a slower temperature increase is now sufficient to lower the value of resistor R3 so far that—in combination with the increased voltage level at inverting input 32 via zener diode D3—the reversal of the voltage ratios described above takes place. As a result of the premature downward temperature regulation, the power electronics are not damaged by the increase in the power loss in power semiconductor element 26 when supply voltage U increases.

Device 1 performs another function using diode D1, which is connected with motor current measuring device 18. Diode D1 permits current to flow via the output signal of motor current measuring device 18 when the voltage level at inverting input 32 of temperature controller 20 is exceeded, combined with the diode forward voltage from diode D1. As a result, the voltage at inverting input 32 of temperature controller 20 increases. The effect also takes place here—as it did when supply voltage U increased—that the downward temperature regulation takes place at a lower temperature. Due to the premature downward temperature regulation, an impermissible temperature increase does not take place at the soldering points of fan regulator 12 loaded with operating current when operating current I increases under special operating conditions.

Device 1 shown can be implemented in a cost-favorable manner using simple means, thereby enabling actuating devices and/or motors in a low-price segment to be operated reliably and have a long service life.

What is claimed is:

1. A method for temperature limitation according to at least one of an operating current (I) and a supply voltage (U), for an actuating device (10) assigned to an electric motor (M), wherein the temperature limitation is carried out as a function of at least one operating parameter of the motor (M), comprising steps of:
    monitoring at least one of the operating current (I) and the supply voltage (U); and
    reducing a maximum value ($T_{max}$) of a permissible temperature of the actuating device (10) when the operating current (I) rises above a specified threshold current value ($I_s$) or when the supply voltage (U) rises above a specified threshold voltage value ($U_s$).

2. The method as recited in claim 1 wherein the operating parameter is chosen from the group composed of operating current (I) and supply voltage (U).

3. The method as recited in claim 1, wherein, with temperature limitation carried out as a function of several operating parameters, the reductions of the maximum value ($T_{max}$) of a permissible temperature assigned to each operating parameter are combined to obtain an overall reduction of the maximum value ($T_{max}$).

4. The method as recited in claim 1, wherein the temperature limitation is activated before the maximum value ($T_{max}$) of a permissible temperature of the actuating device (10) is reached.

5. The method for temperature limitation of claim 1, wherein the temperature limitation is carried out for a fan regulator (12) of a motor vehicle.

6. A device (1) for temperature limitation according to at least one of an operating current (I) and a supply voltage (U), for an actuating device (10) assigned to an electric motor (M), comprising:
    an electrical switching device (14) that carries out the temperature limitation as a function of at least one operating parameter of the motor (M), comprising a temperature controller (20) with an amplifier (22) configured for generating an output signal (24); and
    a power semiconductor element (26) that influences actuation of the motor (M) in response to the output signal (24);
    wherein a maximum value ($T_{max}$) of a permissible temperature of the actuating device (10) is reduced when the operating current (I) rises above a specified threshold current value ($I_s$) or the supply voltage (U) rises above a specified threshold voltage value ($U_s$).

7. The device (1) as recited in claim 6, wherein a component (28) with a temperature-dependent property is assigned to the temperature controller (20).

8. A fan regulator (12) comprising a device (1) as recited in claim 6.

9. The device as recited in claim 6, wherein the actuating device (10) is a fan regulator (12) of a motor vehicle.

10. The device (1) as recited in claim 7, wherein the component (28) is a resistor (R3) with a negative temperature coefficient.

* * * * *